United States Patent
Lagoni et al.

[11] Patent Number: 6,141,058
[45] Date of Patent: *Oct. 31, 2000

[54] TELEVISION RECEIVER HAVING A USER-EDITABLE TELEPHONE SYSTEM CALLER-ID FEATURE

[75] Inventors: William Adamson Lagoni; Robert Lawrence O'Brien, both of Indianapolis, Ind.; Dennis Ronald McCarthy, Syracuse, N.Y.

[73] Assignee: Thomson Licensing S.A., Boulogne, France

[*] Notice: This patent issued on a continued prosecution application filed under 37 CFR 1.53(d), and is subject to the twenty year patent term provisions of 35 U.S.C. 154(a)(2).

[21] Appl. No.: 08/798,049

[22] Filed: Dec. 16, 1996

[51] Int. Cl.[7] .................................................. H04N 5/445
[52] U.S. Cl. .......................... 348/563; 348/564; 379/142
[58] Field of Search .................................. 348/563, 564, 348/565, 566, 552, 553, 725, 6, 134; 379/74, 77, 87, 142, 88, 98, 67, 61, 2 A, 211, 355, 825.52, 58, 59; 340/825.44

[56] References Cited

U.S. PATENT DOCUMENTS

| | | | |
|---|---|---|---|
| 4,356,509 | 10/1982 | Skerlos et al. | 358/85 |
| 4,582,956 | 4/1986 | Doughty | 179/2 A |
| 4,924,496 | 5/1990 | Figa et al. | 379/142 |
| 5,220,599 | 6/1993 | Sasano et al. | 379/142 |
| 5,343,516 | 8/1994 | Callele | 379/98 |
| 5,404,393 | 4/1995 | Temillard | 379/96 |
| 5,410,326 | 4/1995 | Goldstein | 348/134 |
| 5,459,458 | 10/1995 | Richardson et al. | 340/825.52 |
| 5,467,385 | 11/1995 | Reuben et al. | |
| 5,473,671 | 12/1995 | Partridge, III | 379/59 |
| 5,487,111 | 1/1996 | Slusky | 379/211 |
| 5,489,894 | 2/1996 | Murray | 340/825.44 |
| 5,528,680 | 6/1996 | Karpicke | 379/355 |
| 5,550,900 | 8/1996 | Ensor et al. | 379/74 |
| 5,559,860 | 9/1996 | Mizikovosky | 379/58 |
| 5,621,482 | 4/1997 | Gardner et al. | 348/725 |
| 5,623,537 | 4/1997 | Ensor | 379/67 |

FOREIGN PATENT DOCUMENTS

0518274A1  12/1992  European Pat. Off. .......... H04M 1/60

OTHER PUBLICATIONS

Copy of PCT International Search Report citing the above–listed documents AA, AB, AC, AD, and AM.

*Primary Examiner*—Chris S. Kelley
*Assistant Examiner*—Tung Vo
*Attorney, Agent, or Firm*—Joseph S. Tripoli; Robert D. Shed; Frank Y. Liao

[57] ABSTRACT

A television receiver includes telephone network interface circuitry which allows the receiver to receive and process Caller-ID signals for display during the ringing period of the telephone set. The television receiver also includes circuitry which allows a list of priority callers to be entered. In this way, the incoming Caller-ID codes are compared to the telephone numbers of the priority callers. Upon detection, the Caller-ID information of a priority caller is displayed on screen during television viewing. The telephone numbers of those callers not listed as priority callers are not displayed during the ringing period of the telephone. Both displayed and non-displayed telephone numbers which correspond to unanswered telephone calls are stored in a Caller-ID list for display at the user's convenience. In this way, the user is able to enter data to select beforehand which calling telephone numbers are permitted to interrupt his or her television show by displaying Caller-ID information on the screen.

15 Claims, 5 Drawing Sheets

TELEVISION RECEIVER HAVING A USER-EDITABLE TELEPHONE SYSTEM CALLER-ID FEATURE

FIELD OF THE INVENTION

The subject invention concerns generally concerns the field of television receivers having an interface the Internet.

BACKGROUND OF THE INVENTION

The terms "television apparatus" and "television receiver" as used herein include television receivers having a display device (such as, "television sets", and "PC-TV" combination sets), and television receivers not having a display device, such as VCRs, videodisc players, DVD (Digital Video Disc) players, cable converter boxes, satellite receivers, and the like.

A "Caller-ID" (caller identification) feature is commonly available on telephone equipment in the United States. This feature displays, during the ringing period, the telephone number of the calling party, on a display unit associated with a user's telephone. In this way, the called party knows who is calling without having to pick up the phone. The called party can then determine if he or she wishes to answer the phone (i.e., take the call). In an extended Caller-ID system, the name of the person calling is also displayed. That is, a name associated with the number of the calling telephone is displayed. In operation, the Caller-ID information is transmitted by the telephone service provider between the first ring signal and second ring signal sent to the called telephone. Caller-ID circuitry in the telephone set receives and decodes the Caller-ID message for display on its display unit (usually an LCD display).

It has been proposed, for example in U.S. Pat. No. 5,343,516 (Callele, et al.), issued Aug. 30, 1994, and entitled COMPUTER TELECOMMUNICATIONS SIGNALING INTERFACE, that a telephone network interface unit be equipped with an infrared transmitter for sending caller-ID signals to a television receiver for display using the on-screen display apparatus of the television receiver, in order to provide a caller-ID feature. Callele, et al. also states that, in the alternative, the closed caption display circuitry could be used to display the caller's name or number data.

U.S. Pat. No. 5,550,900 (Ensor, et al.), issued Aug. 27, 1996, and entitled APPARATUS AND METHOD FOR ROUTING MESSAGES IN A TELEPHONE MESSAGE CENTER, discloses a video display device for displaying Caller-ID information during the ringing period of the telephone. Ensor, et al. also teach that the audio portion of the television program be attenuated to assist the user in hearing the incoming telephone ring signal. Ensor, et al. also discloses the storing, for display at a later time, of a list of Caller-ID messages, and discriminating among received Caller-ID messages to permit forwarding of certain phone calls to particular addressable telephone units in a household telephone system.

It is recognized that the use of the on-screen display (OSD) apparatus of a television receiver for displaying Caller-ID information has its advantages. However, it is further recognized that when a television receiver is operating in an entertainment mode (as opposed to a PC-TV mode of operation), it may prove to be extremely annoying to have the continuity of a viewer's television programs interrupted by repeated on-screen display of Caller-ID messages.

SUMMARY OF THE INVENTION

A television receiver includes telephone network interface circuitry which allows the receiver to receive and process Caller-ID signals for display during the ringing period of the telephone set. The television receiver also includes circuitry which allows a list of priority callers to be entered. In this way, the incoming Caller-ID codes are compared to the telephone numbers of the priority callers. Upon detection, the Caller-ID information of a priority caller is displayed on screen during television viewing. The telephone numbers of those callers not listed as priority callers are not displayed during the ringing period of the telephone. Both displayed and non-displayed telephone numbers which correspond to unanswered telephone calls are stored in a Caller-ID list for display at the user's convenience. In this way, the user is able to enter data to select beforehand which calling telephone numbers are permitted to interrupt his or her television show by displaying Caller-ID information on the screen.

DETAILED DESCRIPTION OF THE DRAWING

Figure 1:
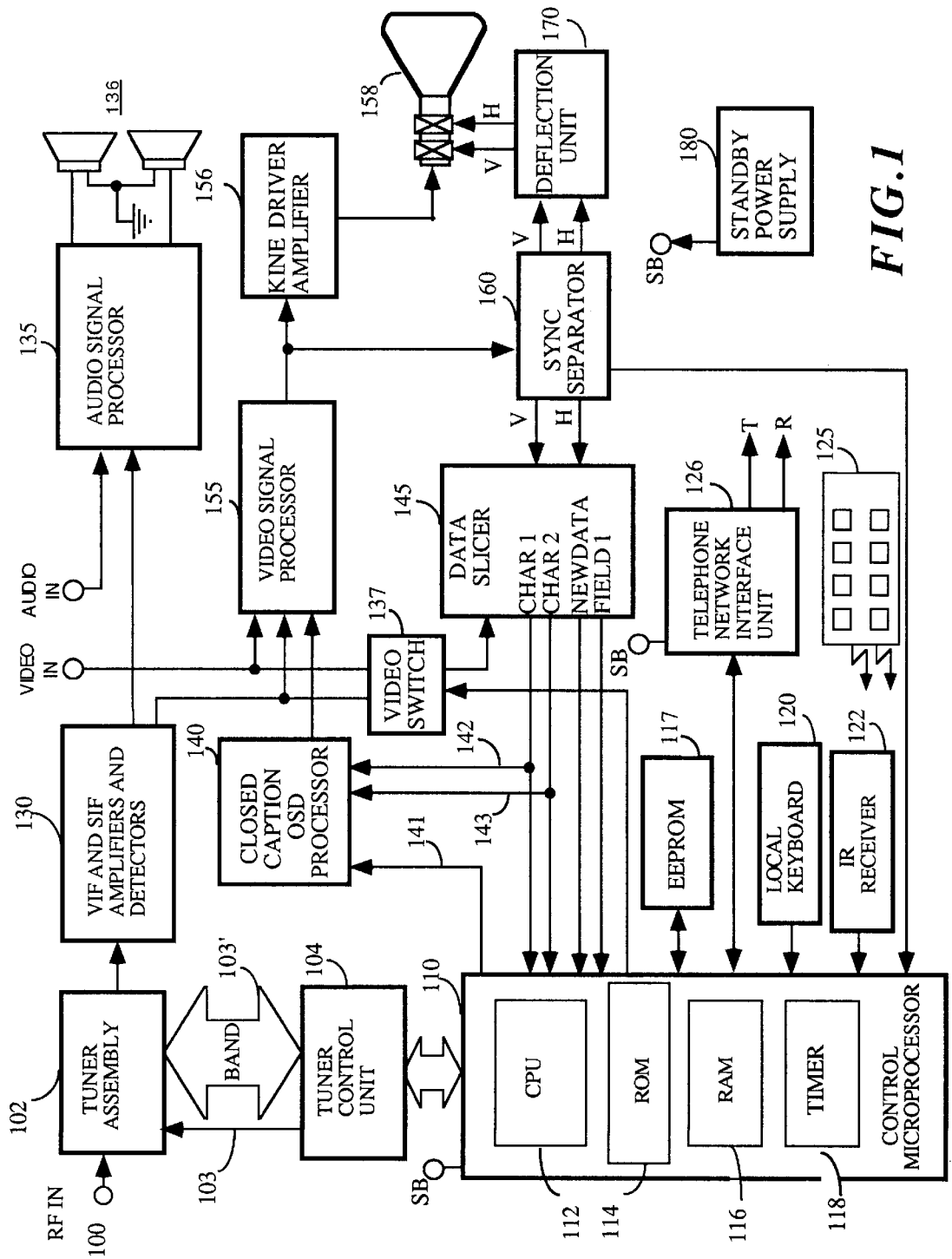
FIG. 1 shows a television receiver suitable for use with the invention.

A television receiver having user-editable Caller-ID capability will now be described with reference to the FIGURES. Referring to FIG. 1, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103', to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The detected audio signal is applied to an audio processor 135 for processing and amplification before being applied to a speaker assembly 136.

Tuner controller 104 generates the tuning voltage and bandswitching signals in response to control signals applied from a system control microcomputer ($\mu$C) 110. The terms "microcomputer", controller, and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel-related data in a random-access memory (RAM) 116. RAM 116 may be either internal to, or external to, microprocessor 110, and may be of either the volatile or non-volatile type. The term "RAM" is also intended to include electrically-erasable programmable read only memory (EEPROM) 117. One skilled in the art will recognize that if volatile memory is utilized, that it may be desirable to use a suitable form of standby power (such as from STANDBY POWER SUPPLY 180) to preserve its contents when the receiver is turned off.

Microcomputer 110 also includes a timer 118 for providing timing signals as needed. Microcomputer (or controller) 110 generates a control signal for causing tuner control unit 104 to control tuner 102 to select a particular RF signal, in response to user-entered control signals from local keyboard 120 and from infrared (IR) receiver 122. IR receiver 122 is powered from Standby Power Supply 180 to be able to receive a command to turn-on the receiver.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processor unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown). Electrically-erasable programmable read only memory (EEPROM) 117 is coupled to controller 110, and serves as a non-volatile storage element for storing autoprogramming channel data, and user-entered channel data.

The processed video signal at the output of video signal processor unit 155, is applied to a Kine Driver Amplifier 156 for amplification and then applied to the guns of a color picture tube assembly 158 for display. The processed video signal at the output of video signal processor unit 155, is also applied to a Sync Separator unit 160 for separation of horizontal and vertical drive signals which are in turn applied to a deflection unit 170. The output signals from deflection unit 170 are applied to deflection coils of picture tube assembly 158 for controlling the deflection of its electron beam.

The television receiver may also include closed caption circuitry as follows. A Data Slicer 145 receives closed caption data at a first input from VIF/SIF amplifier and detector unit 130, and at a second input from the VIDEO IN terminal via a Video Switch 137 which selects the proper source of closed-caption data under control of controller 110. Data Slicer 145 supplies closed-caption data to Closed Caption OSD Processor 140 via lines 142 and 143. Data Slicer 145 supplies closed-caption status data (Newdata, Field 1) to controller 110. Under control of controller 110, via control line 141, Closed Caption OSD Processor 140 generates character signals, and applies them to an input of video signal processor 155, for inclusion in the processed video signal. Alternatively, Closed Caption OSD Processor 140 and Data Slicer 145 may be included in controller 110. As noted above, although either OSD circuitry or closed caption display circuitry may be used to display Caller-ID data, preferably the OSD circuitry is employed, as described below.

A Telephone Network Interface Unit 126 is coupled to an external telephone network via Tip (T) and Ring (R) terminals for receiving Caller-ID signals transmitted by the telephone service provider. Telephone Network Interface Unit 126 is also coupled to controller 110 for providing decoded Caller-ID signals for display on picture tube 158. Telephone Network Interface Unit 126 and controller 110 are both coupled to a source of standby power (SB) 180 so that Caller-ID signals may be processed even when the television receiver is switched off and incapable of displaying a picture. Telephone Network Interface Unit 126 continually monitors incoming telephone calls for Caller-ID signals transmitted between the first and second rings, and upon detection applies them to controller 110.

Figure 2:
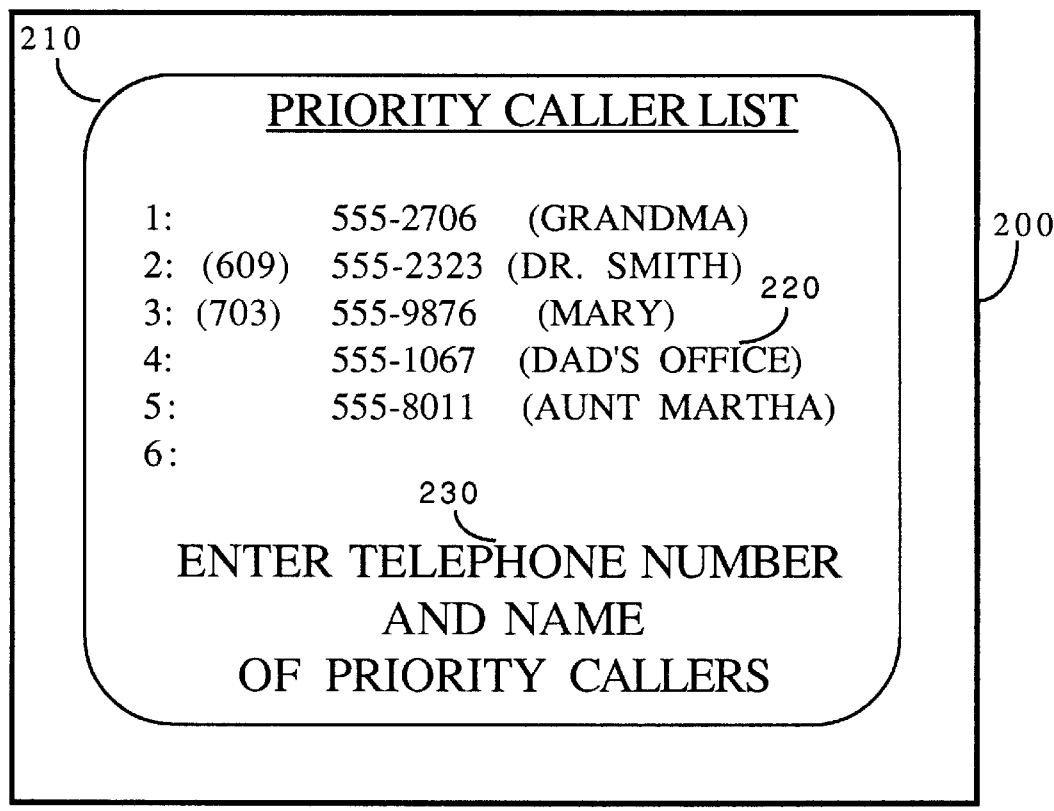
FIG. 2 shows a screen display of a Priority Caller Caller-ID list in accordance with the invention.

The television receiver 200 of FIG. 2 is showing a screen display 210 entitled Priority Caller List. Six entry areas of the list are shown 220, five of which contain data entered by a user. The five entries represent telephone numbers and names of various individuals whom the user desires to accord a priority status. When any of those five Caller-ID codes are detected in an incoming call, the OSD is controlled to place a message on the display screen of the television receiver, if the television receiver is switched on (i.e., active, and able to display a picture). Any other Caller-ID code will not cause the display of an on-screen Caller-ID message. A message 230 displayed at the bottom of the screen prompts the user to enter the telephone number and name of any other priority callers desired.

Figure 3:
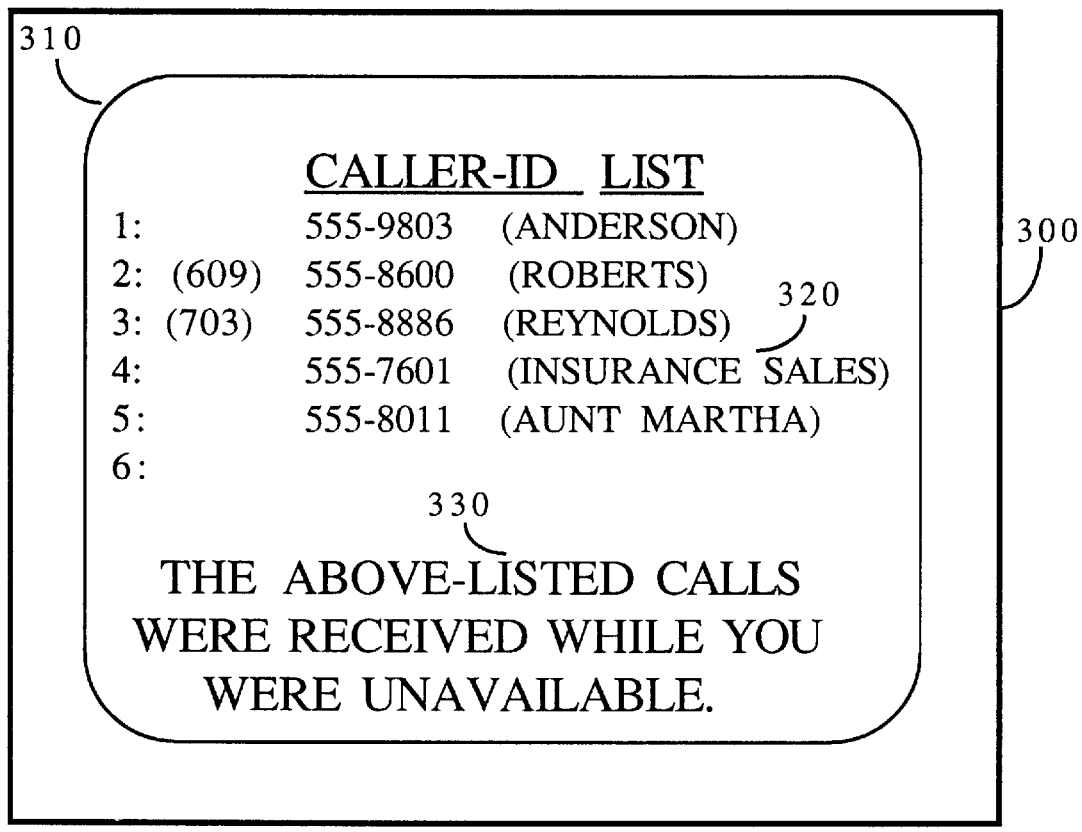
FIG. 3 shows a screen display of a received-call Caller-ID list in accordance with the invention.

The television receiver 300 of FIG. 3 is showing a screen display 310 entitled Caller-ID List. Six entry areas of the list are shown 320, five of which contain data showing that five unanswered telephone calls were received. The four of the five entries represent telephone numbers and names of various individuals whom the user did not desire to accord a priority status. The fifth (Aunt Martha) is a priority caller, who called when the user was unavailable to answer the call. The Caller-ID list and the Priority Caller List are both caused to be displayed by accessing a caller ID menu, or by pressing a particular key of remote control unit 125.

Figure 4:
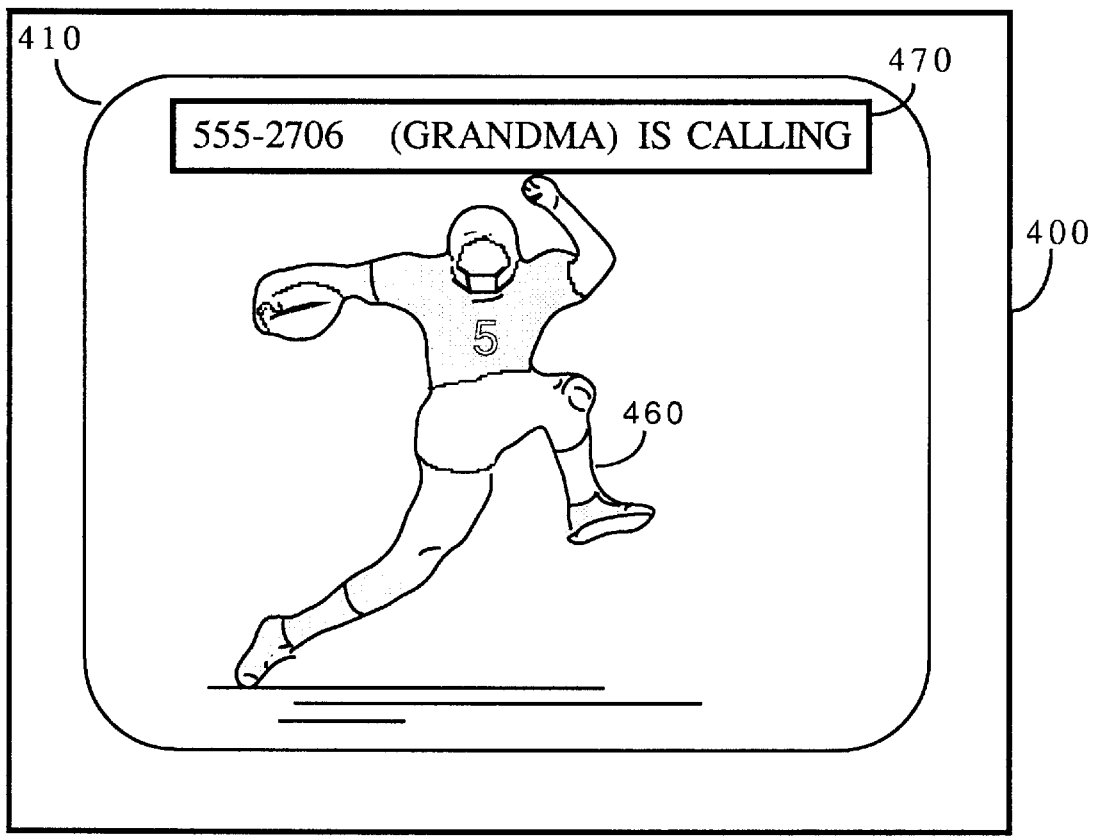
FIG. 4 shows a screen display of active video with a Caller-ID message superimposed thereon in accordance with the invention.

The television receiver 400 of FIG. 4 is showing a screen display 410 of active video 460 with a Caller-ID message 470 superimposed on the active video. It is herein recognized that the caller ID message could also be displayed in a PIP inset, if desired. Note that the Caller-ID message indicates that an incoming call is being received, and note that the incoming call is from a priority caller (Grandma). In accordance with the subject invention, calls from non-priority callers are not displayed over the active video, so that the viewer is not interrupted by seemingly endless Caller-ID messages.

Figure 5:
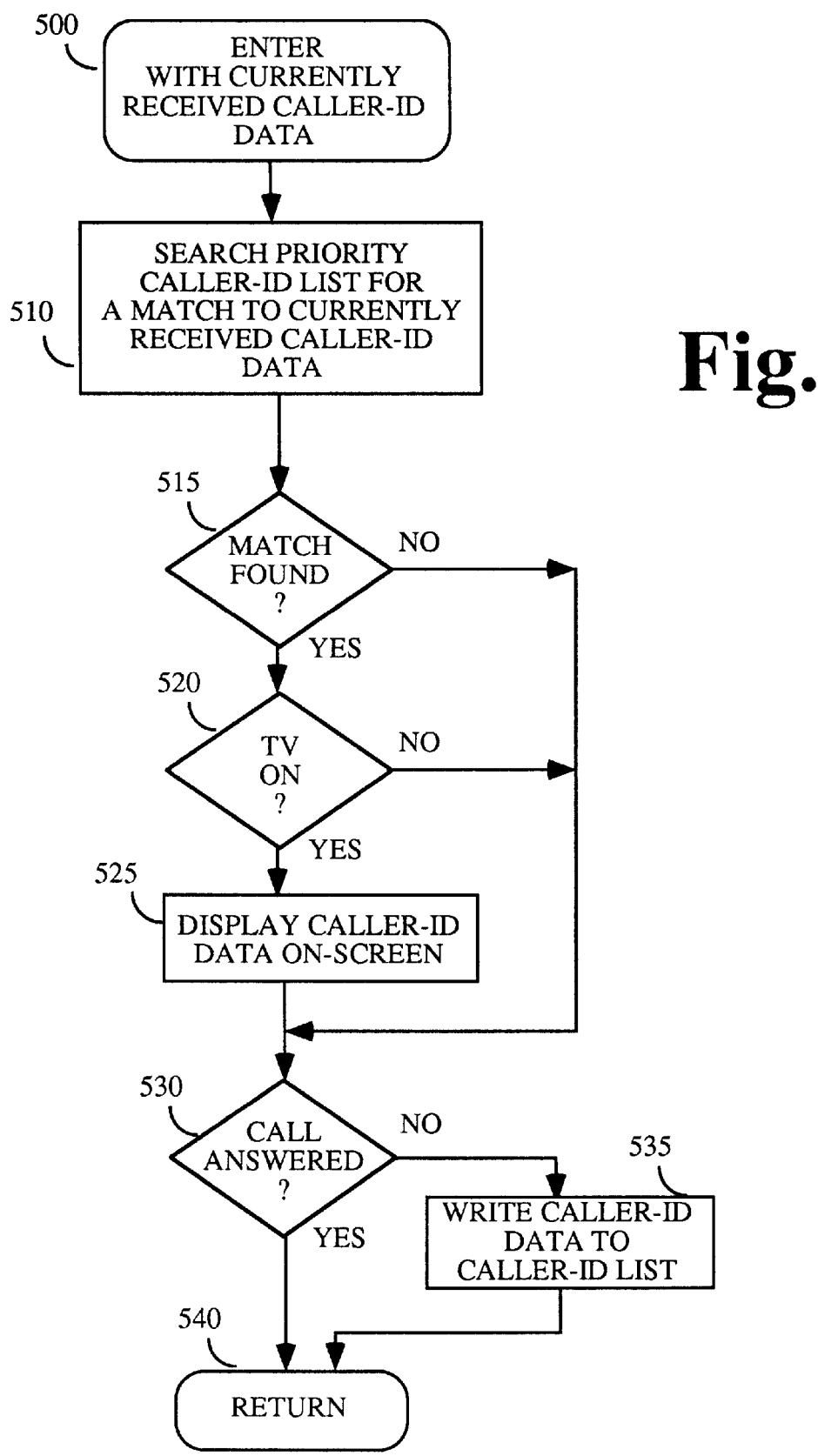
FIG. 5 shows a flowchart illustrating a relevant portion of the control program of controller 110 of FIG. 1.

The flowchart of FIG. 5 shows how the discrimination between priority callers and non-priority callers is accomplished. The routine is entered at step 500 with currently received Caller-ID data. At step 510, controller 110 searches the data stored in memory which represents the priority caller data. A determination of a match is made at step 515. If the currently received data does not match a stored priority caller entry, then the NO path is taken to step 530, at which a determination is made as to whether or not the call has been answered. If not, the currently received Caller-ID data is stored (Step 535) in a portion of memory accessed by controller 110 to generate the Caller-ID list display of FIG. 3. The routine is then exited at step 540.

If at step 515, a determination was made that the currently received data did match a priority caller entry, then the YES path is taken to step 520. At step 520, the a check is made to see if the TV is switched on. If not, the NO path is taken to step 530 to see if the call is answered. If the call is answered, then there is no need to store the Caller-ID data and the program is exited at step 540. If the call is not answered, then the program advances to step 535 for Caller-ID data storage, before exiting at step 540.

If at step 520, it was found that the TV is switched on, then the YES path is taken to step 525 wherein the currently received Caller-ID data is displayed over the active video. The program then advances to step 530 to see if the call is answered. If the call is answered, then there is no need to store the Caller-ID data and the program is exited at step 540. If the call is not answered, then the program advances to step 535 for Caller-ID data storage, before exiting at step 540.

We claim:

1. Television apparatus, comprising:

means for processing a television signal to produce a program video signal;

means for receiving a message signal comprising a source identification;

means for allowing a user to store a list of source identifications and for assigning a respective source identification label to each source identification to said list of source identifications;

means for comparing and matching said source identification to said list of source identifications;

means for selectively generating for display a graphics video signal corresponding to one of said source identification labels only if said source identification matching an entry in said list of source identifications; and means for combining said program video signal and said graphics video signal to produce a combined video signal which corresponds to an image containing a program portion and a source identification portion, whereby viewing interference due to incoming message signals is minimized in that said source identification portion is only displayed when said source identification list has a corresponding entry in said identifications and nothing is displayed including but not limited to a source identification portion is displayed if said source identification list has no corresponding entry.

2. The television apparatus recited in claim 1, wherein said message signal is a telephone message signal and said source identification is a caller identification (ID).

3. The television apparatus of claim 2, wherein said list of source identifications comprises a plurality of Caller-ID messages for identifying respective ones of a plurality of telephone numbers.

4. The television apparatus of claim 2, wherein said means for allowing comprises data entry means for entering a plurality of messages.

5. The television apparatus of claim 4, wherein said data entry means comprises a remote control signal receiver for receiving remote control signals produced by a remote control transmitter.

6. The television apparatus of claim 2 wherein said means for allowing stores said source identification of said received message signal when said source identification matches an entry in said list of source identification, and said received message signal is not answered by the user.

7. The television apparatus of claim 2 wherein said graphics video signals are included as PIP insets in the combined video signal.

8. Television apparatus, comprising:

means for processing a television signal for producing an output video signal representing a television program during an entertainment mode of operation;

means for receiving a telephone signal including a first message; and control means for processing said telephone signal and comparing and matching said first message with message data scored in said television apparatus, and for including in said output video signal a signal representing a second message relating to said first message included in said telephone signal; said output video signal being suitable for coupling to a display device for producing a displayed image having a first portion representing said television program and having a second portion representing said second message; said second portion interrupting viewing of said first portion during said entertainment mode of operation;

said control means including said signal representing said second message in said output signal during said entertainment mode of operation only in response to detecting that if said first message included in said telephone signal corresponds to matches said stored message data in response to the comparison and not displaying any message if said first message does not match said stored message data, therefore preventing said second portion of said displayed image from interrupting viewing of said first portion of said displayed image.

9. The television apparatus of claim 8, wherein said telephone signal corresponds to a currently received telephone call;

said first message included in said telephone signal comprises a Caller-ID message;

said control means comprises data entry means for entering a plurality of messages, and data storage means for storing said plurality of messages;

said control means includes said second message in said output signal during said entertainment mode of operation only in response to detecting that said Caller-ID message included in said telephone signal matches one of said plurality of stored messages;

said second message comprises Caller-ID information relating to said currently received telephone call.

10. The television apparatus of claim 9, wherein said plurality of stored messages comprises a plurality of Caller-ID messages for identifying respective ones of a plurality of telephone numbers;

said second message indicates which one of said plurality of Caller-ID messages matches said Caller-ID message included in said currently received telephone call.

11. The television apparatus of claim 9, wherein said data entry means comprises a remote control signal receiver for receiving remote control signals produced by a remote control transmitter.

12. The television apparatus of claim 10, wherein said control means stores said Caller-ID message included in said telephone signal in said data storage means in response to said data storage means not containing a Caller-ID message matching said Caller-ID message included in said telephone signal, and said currently received telephone call being unanswered.

13. The television apparatus of any one of claim 8, wherein said control means includes said second message signal in said output signal for superimposing said second portion of said displayed image on said first portion of said displayed image.

14. The television apparatus of any one of claim 8, wherein said control means includes said second message signal in said output signal for including said second portion of said displayed image in a PIP inset into the first portion of the displayed image.

15. A method for producing an output video signal, comprising the steps of:

processing a television signal for producing an output video signal representing a television program during an entertainment mode of operation;

receiving a telephone signal including a first message; and processing the telephone signal for comparing whether the first message matches message data stored in the television apparatus, and for including in the output video signal a display signal relating to the first message included in the telephone signal; the output video signal being suitable for coupling to a display device for producing a displayed image having a first portion representing the television program and having a second portion representing the display signal; the second portion interrupting viewing of the first portion during the entertainment mode of operation;

the control means including the display signal relating to the first message in the output signal during the entertainment mode of operation only in response to a match of the first message included in the telephone signal with the stored message data and no display if there is no match therefore preventing the second portion of the displayed image from interrupting viewing of the first portion of the displayed image.

* * * * *